US008678285B2

(12) United States Patent
Kearney

(10) Patent No.: US 8,678,285 B2
(45) Date of Patent: Mar. 25, 2014

(54) METHOD OF AND APPARATUS FOR MULTIPLYING RASTER SCANNING LINES BY MODULATING A MULTI-CAVITY LASER DIODE

(75) Inventor: Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 26 days.

(21) Appl. No.: 13/236,984

(22) Filed: Sep. 20, 2011

(65) Prior Publication Data
US 2013/0068840 A1 Mar. 21, 2013

(51) Int. Cl.
G06K 7/10 (2006.01)
G06K 9/36 (2006.01)
G02B 26/00 (2006.01)

(52) U.S. Cl.
USPC .............. 235/462.01; 235/462.1; 235/462.39; 235/462.11; 235/462.38; 235/462.42

(58) Field of Classification Search
USPC .............. 235/462.01, 462.1, 462.06, 462.11, 235/462.38, 462.39, 462.4, 462.41
See application file for complete search history.

(56) References Cited

U.S. PATENT DOCUMENTS

| | | | | | |
|---|---|---|---|---|---|
| 4,224,509 | A | * | 9/1980 | Cheng | 235/462.34 |
| 4,794,237 | A | * | 12/1988 | Ferrante | 235/462.34 |
| 5,000,529 | A | * | 3/1991 | Katoh et al. | 359/216.1 |
| 5,039,184 | A | * | 8/1991 | Murakawa et al. | 359/216.1 |
| 5,229,588 | A | * | 7/1993 | Detwiler et al. | 235/462.35 |
| 5,252,816 | A | * | 10/1993 | Onimaru et al. | 235/462.36 |
| 5,294,774 | A | * | 3/1994 | Stone | 219/121.77 |
| 5,545,886 | A | * | 8/1996 | Metlitsky et al. | 235/462.42 |
| 5,600,119 | A | * | 2/1997 | Dvorkis et al. | 235/462.1 |
| 5,684,289 | A | * | 11/1997 | Detwiler et al. | 235/462.35 |
| 5,712,470 | A | * | 1/1998 | Katz et al. | 235/462.32 |
| 5,796,091 | A | * | 8/1998 | Schmidt et al. | 235/472.01 |
| 5,844,227 | A | * | 12/1998 | Schmidt et al. | 235/472.01 |
| 5,886,336 | A | * | 3/1999 | Tang et al. | 235/462.43 |
| 5,912,450 | A | * | 6/1999 | Katz et al. | 235/462.32 |
| 6,062,476 | A | * | 5/2000 | Stern et al. | 235/462.35 |
| 6,247,648 | B1 | * | 6/2001 | Katz et al. | 235/462.42 |
| 6,273,337 | B1 | * | 8/2001 | Detwiler et al. | 235/462.32 |
| 6,454,169 | B1 | * | 9/2002 | Belknap et al. | 235/462.4 |
| 6,543,693 | B1 | * | 4/2003 | Stern et al. | 235/462.35 |
| 6,543,694 | B1 | * | 4/2003 | Detwiler | 235/462.4 |
| 6,905,071 | B2 | * | 6/2005 | Schmidt et al. | 235/462.45 |
| 7,077,324 | B2 | * | 7/2006 | Tien | 235/462.32 |
| 8,118,228 | B2 | * | 2/2012 | Good | 235/472.01 |
| 8,408,469 | B2 | * | 4/2013 | Good | 235/462.38 |
| 2002/0014532 | A1 | * | 2/2002 | Yomogida et al. | 235/462.38 |
| 2002/0104886 | A1 | * | 8/2002 | Martin et al. | 235/462.45 |
| 2002/0179708 | A1 | * | 12/2002 | Zhu et al. | 235/454 |
| 2002/0185539 | A1 | * | 12/2002 | Belknap et al. | 235/462.4 |
| 2004/0182934 | A1 | * | 9/2004 | Tien | 235/462.41 |
| 2005/0133601 | A1 | * | 6/2005 | Yomogida et al. | 235/462.38 |
| 2005/0269413 | A1 | * | 12/2005 | Hammer et al. | 235/462.39 |

(Continued)

Primary Examiner — Daniel Walsh
(74) Attorney, Agent, or Firm — Additon, Higgins, Pendleton & Ashe, P.A.

(57) ABSTRACT

A method of and apparatus for generating a multiple raster-type scanning pattern by modulating a multi-cavity laser diode in such a way that it sequentially generates different laser beams synchronously during different laser scanning cycles, while the output laser beams are directed incident upon a rotating polygonal laser scanning element. The system does not require additional moving parts beyond the rotating polygon scanning element so as to reduce complexity and simplify construction of the laser scanning mechanism.

15 Claims, 10 Drawing Sheets

(56) References Cited

U.S. PATENT DOCUMENTS

| | | | |
|---|---|---|---|
| 2006/0274396 A1* | 12/2006 | Ijzerman et al. | 359/224 |
| 2008/0011857 A1* | 1/2008 | Detwiler | 235/462.38 |
| 2010/0060863 A1* | 3/2010 | Hudman et al. | 353/70 |
| 2010/0252634 A1* | 10/2010 | Good | 235/462.38 |
| 2010/0258632 A1* | 10/2010 | Good | 235/472.01 |
| 2012/0085825 A1* | 4/2012 | Good | 235/470 |
| 2013/0043312 A1* | 2/2013 | Van Horn | 235/462.1 |
| 2013/0175343 A1* | 7/2013 | Good | 235/462.32 |

* cited by examiner

METHOD OF AND APPARATUS FOR MULTIPLYING RASTER SCANNING LINES BY MODULATING A MULTI-CAVITY LASER DIODE

BACKGROUND OF DISCLOSURE

1. Field of Disclosure

The present disclosure relates to improvements in bar code symbol reading systems employing laser scanning patterns having improved characteristics.

2. Brief Description of the State of Knowledge in the Art

Bi-optic laser scanners require the projection of several scan lines at multiple angles and directions to ensure code coverage and increased probability of a successful scan. A raster pattern can be generated in such a way that multiply the parallel scan lines of the raster scanning pattern. This is typically accomplished using multi-faceted reflective polygons that include various facet angles. For each additional raster line, scan performance will likely increase.

U.S. Pat. No. 7,077,324 to Tien discloses a multi-line raster-type barcode laser scanner with no moving parts. The laser scanner includes a light source, a light condensing lens and a linear light receiver. The system employs at least one beam splitter and reflectors disposed at the projecting path from the light source converted into scanning light beam to the barcode, so as to enable the scanner to project two or more scanning light beams onto a same barcode in a non-overlapping manner. This enables the selection of a complete barcode image for decoding at a fastest speed and for further increasing the barcode reading rate from the barcode at different angles or positions.

However, the number of scan lines in the raster pattern of U.S. Pat. No. 7,077,324 is limited to the number of beam splitters and reflectors which complicates the design and increases manufacturing costs.

Thus, there is a great need for improvement in the method of and apparatus for generating a multiple-type raster scanning pattern for scanning bar code symbols with increased scanning speed and read rates, while avoiding the shortcomings and drawbacks of prior art apparatus and methodologies.

SUMMARY AND OBJECTS OF THE PRESENT DISCLOSURE

Accordingly, it is a primary object of the present disclosure to provide a new and improved way of and means for generating multi-line laser scanning patterns with improved laser scanning characteristics, while avoiding the shortcomings and drawbacks of prior art apparatus and methodologies.

Another object is to provide a new and improved method of laser scanning bar code symbols using an electro-optical module employing a multi-cavity visible laser diode (VLD) having multiple laser cavities that are sequentially activated and driven in synchronism with a rotating scanning element, so as to produce multiple (e.g. double) raster-type laser scanning line pattern, for scanning bar code symbols during bar code symbol reading operations.

Another object is to provide a new and improved apparatus for laser scanning bar code symbols using an electro-optical module employing a multi-cavity visible laser diode (VLD) having multiple laser cavities that are sequentially activated and driven in synchronism with a rotating scanning element, so as to produce multiple laser beams that are transformed into a multiple raster-type laser scanning line pattern, for scanning bar code symbols during bar code symbol reading operations.

Another object is to provide a new and improved hand-supportable laser scanning system, employing an electro-optical module having a multi-cavity visible laser diode (VLD) with multiple laser cavities that are sequentially activated and driven in synchronism with a rotating scanning element, so as to produce multiple laser beams that are transformed into a multiple raster-type laser scanning line pattern, for scanning bar code symbols during bar code symbol reading operations.

Another object is to provide a new and improved bi-optical laser scanning system, employing an electro-optical module that generates a plurality of laser scanning beams in synchronism with a rotating scanning element, which are transformed into a multiple (e.g. double) raster-type laser scanning line pattern, for scanning bar code symbols during bar code symbol reading operations.

Another object is to provide a new and improved hand-supportable laser scanning reading bar code symbol reading system, capable of selectively generating a single line laser scanning pattern, or a multiple-line raster-type laser scanning pattern, as required by the application at hand, to read high density 2D stacked bar code symbologies with improved levels of performance.

Another object is to provide a new and improved method of and apparatus for multiplying laser scanning lines in raster-type laser scanning pattern by modulating a multi-cavity laser diode to generate multiple laser beams at different moments in time, while directing the output laser beam upon a rotating polygon scanning element.

These and other objects will become more apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION OF THE ILLUSTRATIVE EMBODIMENTS OF THE PRESENT DISCLOSURE

Figure 1:
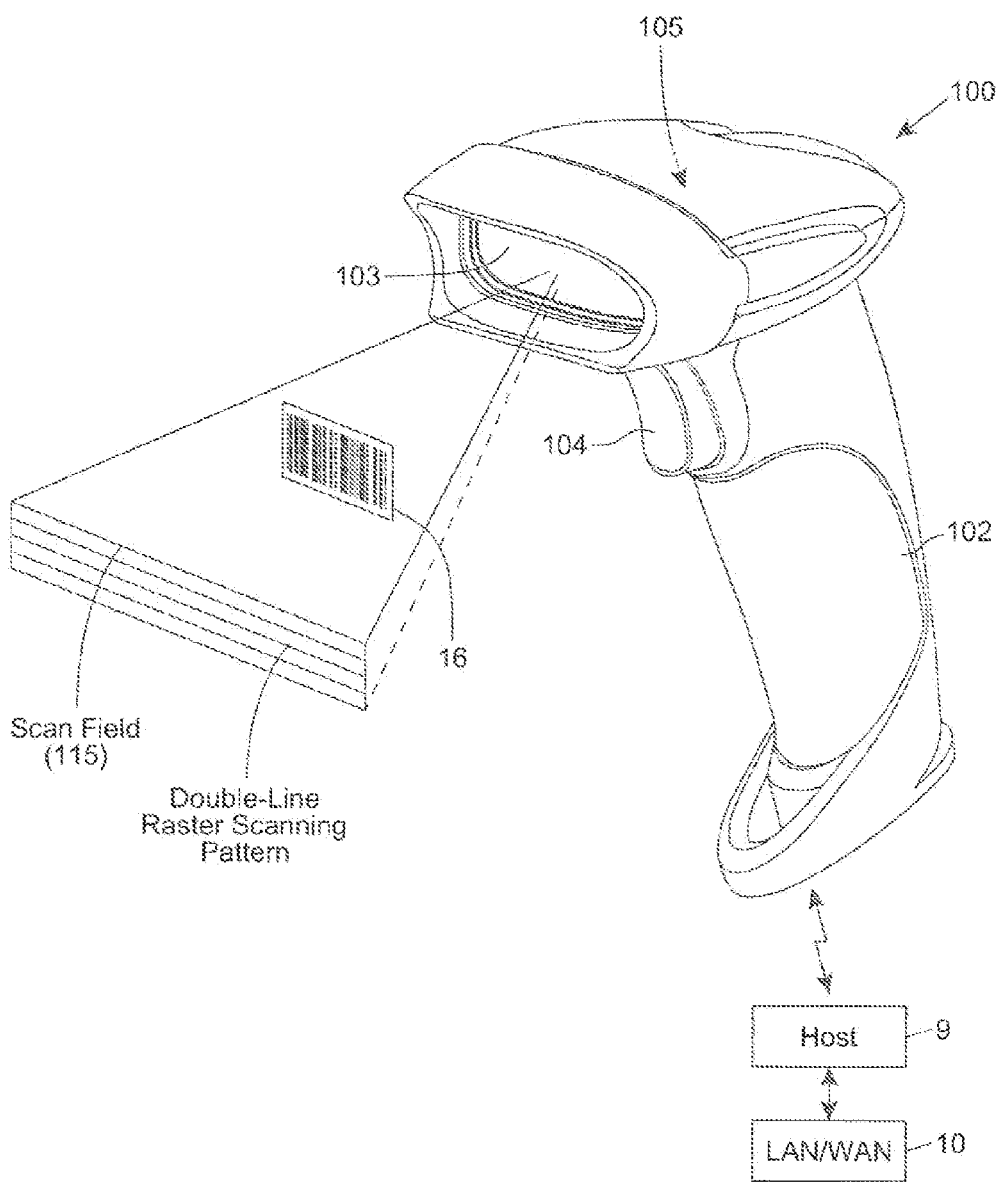
FIG. 1 is a perspective of a hand-supportable laser scanning bar code symbol reading system employing a multi-cavity visible laser diode (VLD) to generate multiple raster-type laser patterns during laser scanning operations, illustrated in FIG. 2A.

Referring to the figures in the accompanying Drawings, the illustrative embodiment of the digital imaging system will be described in greater detail, wherein like elements will be indicated using like reference numerals.

Overview of Method of and Apparatus of the Present Disclosure

A method of and apparatus for generating a multiple raster-type scanning pattern by modulating a multi-cavity laser diode in such a way that it sequentially generates different laser beams synchronously during different laser scanning cycles, while the output laser beams are directed incident upon a rotating polygonal laser scanning element. The system does not require additional moving parts beyond the rotating polygon scanning element so as to reduce complexity and simplify construction of the laser scanning mechanism.

Specifically, the method involves performing the following steps in a housing: (a) sequentially activating and driving the laser cavities of a multi-cavity laser diode so as to generate, along an optical axis, multiple laser beams from the multi-cavity laser diode, so that a different laser beam is generated from one of the laser cavities during each laser scanning cycle (i.e. complete rotation of the polygonal scanning element); (b) rotating the polygonal scanning element about an axis within the housing; (c) directing the multiple laser beams towards the rotating polygonal scanning element so as to generate multiple sets of raster-type laser scanning lines; (d) projecting the multiple sets of raster-type laser scanning lines through the light transmission window within a scanning field defined external to the light transmission window; and (e) presenting a bar code symbol within the scanning field for scanning by one or more of the multiple sets of raster-type laser scanning lines.

For purposes of illustration, several different laser scanning systems will be now described in great technical detail, to show how the above-described method can be carried out in various applications.

Specification of the Bar Code Symbol Reading System of the Illustrative Embodiment Employing a Dual-Cavity Laser Module to Generate A Double Raster-Type Laser Scanning Pattern Referring now to FIGS. 1 through 3, an illustrative embodiment of a manually-triggered/automatically-triggered hand-supportable laser scanning bar code symbol reading system 1 will be described in detail.

As shown in FIG. 1, the laser scanning bar code symbol reading system 100 comprises: a hand-supportable housing 102 having a head portion and a handle portion supporting the head portion; a light transmission window 103 integrated with the head portion of the housing 102; and a laser scanning module 105 for generating and scanning a laser beam across the laser scanning field, in several different modes of operation.

In the single scan-line mode of operation, the laser scanning module 105 generates a single laser beam which is repeatedly swept across the scanning field 115 in a single scanning plane.

In the raster scanning mode, the laser scanning module 105 alternately generates first and second laser scanning beams, in synchronism with its rotating polygon scanning element, so as to produce a dual raster-type laser scanning pattern in the scanning field. While the single scan-line mode of operation is important in practice and well known in the art, the raster scanning mode, and its unique method of generation, will be described in greater detail hereinafter.

Figure 2:
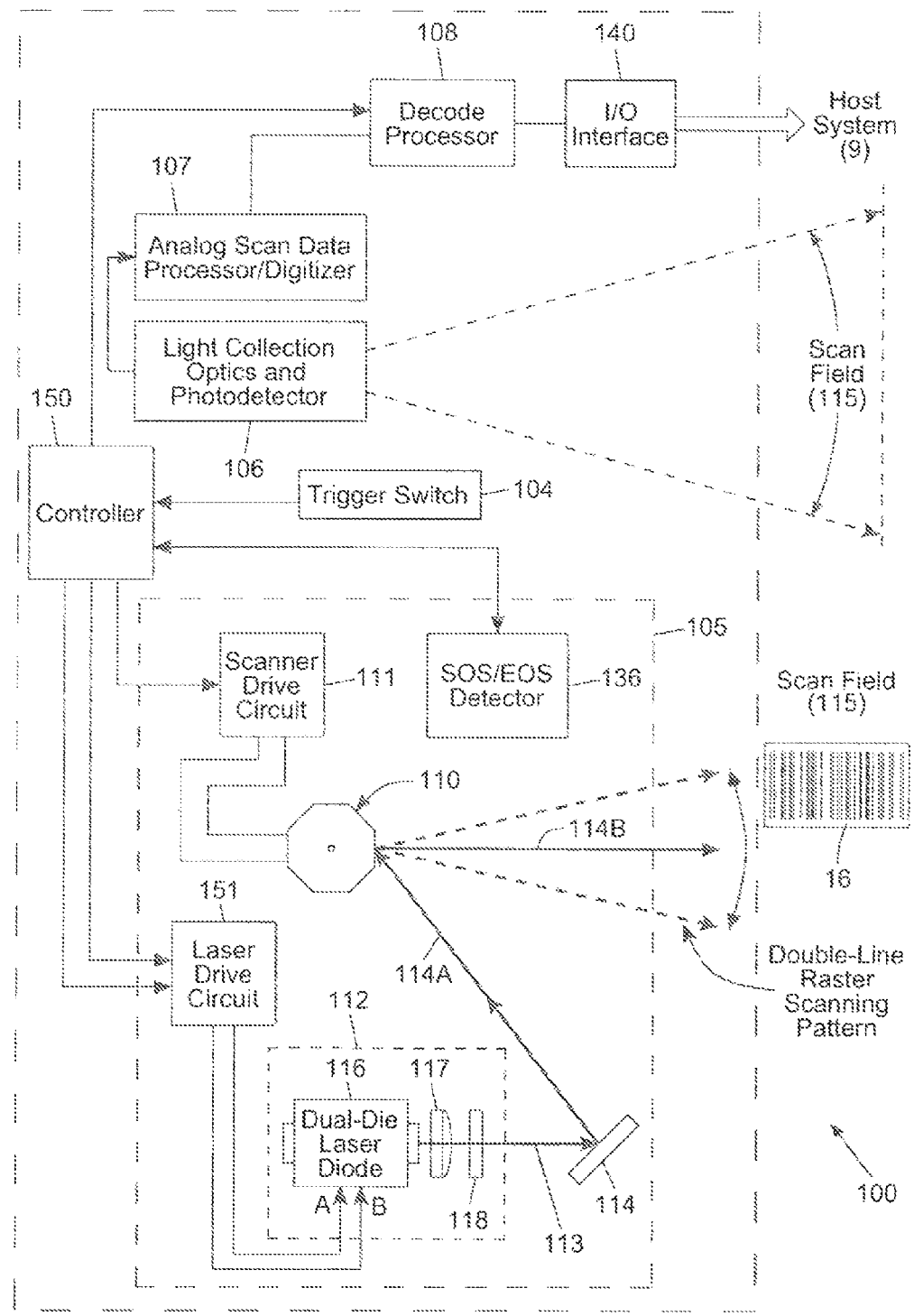
FIG. 2 is a schematic block diagram describing the primary system components within the hand-supportable laser scanning bar code symbol reading system of FIG. 1, including a multi-cavity laser beam production module (i.e. an electro-optical module for producing multiple raster-type laser patterns during each laser scanning cycle, as shown in FIG. 2A.
Figure 2A:
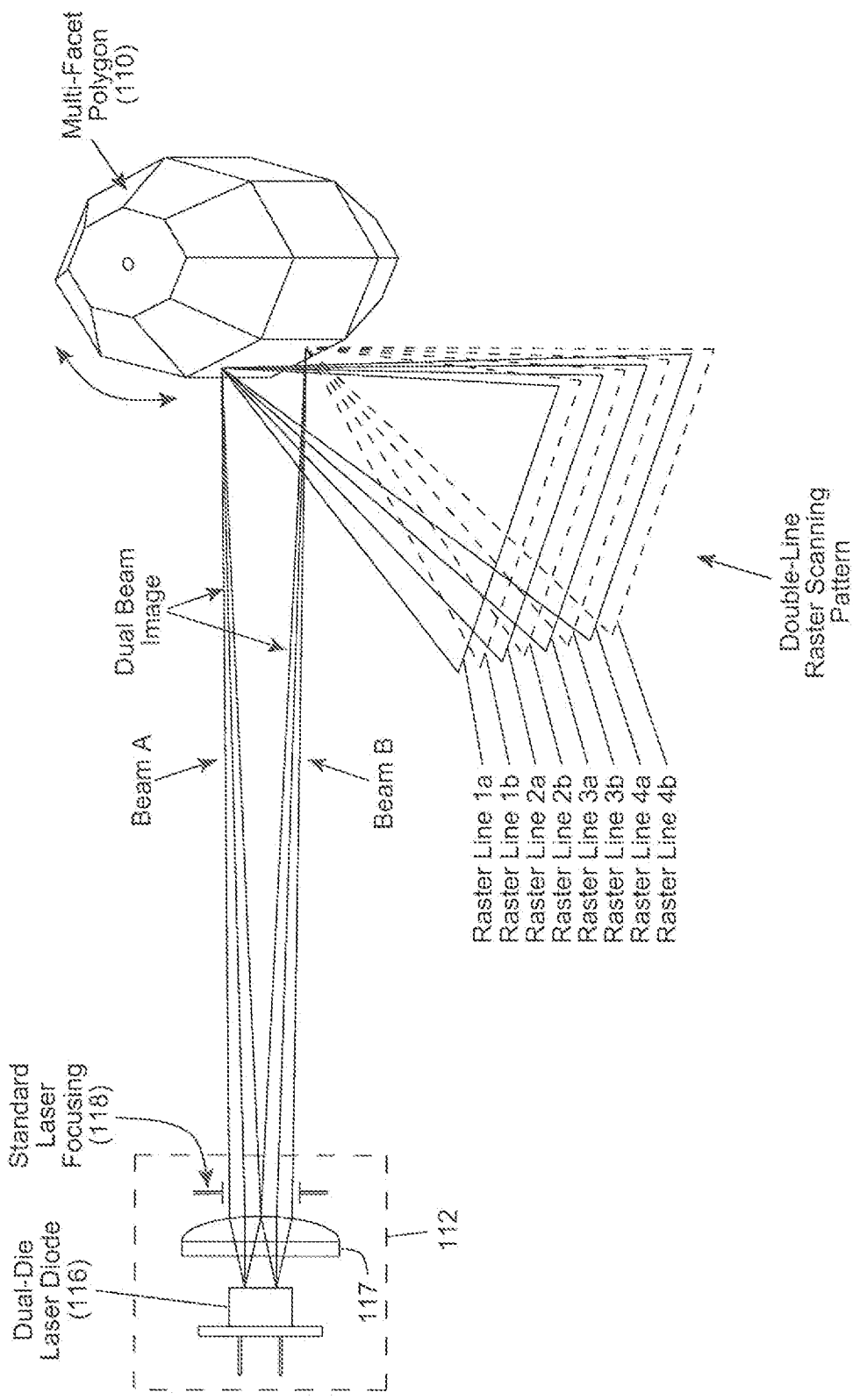
FIG. 2A is a schematic diagram of the electro-optical laser beam production module employed in the system of FIG. 2, and the system of FIG. 4A, comprising a multi-cavity (i.e. multi-die) visible laser diode (VLD), a collimating lens, and an aperture stop through which multiple (e.g. two) laser beams are allowed to pass towards a rotating polygonal-type scanning element.
Figure 2B:
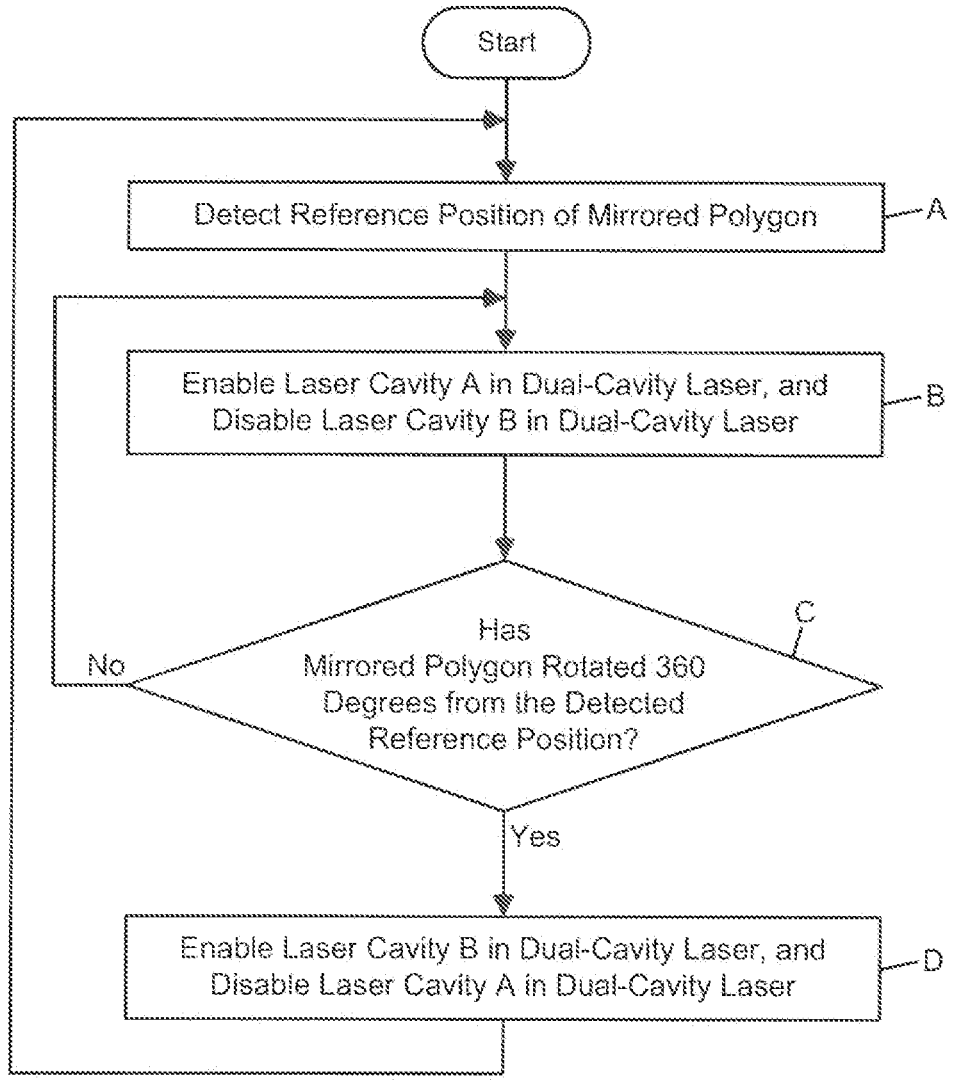
FIG. 2B is a flow chart describing the primary steps of a control process carried out by the system controller, for controlling (i.e. activating and driving) the multi-cavity VLD in synchronism with the rotation of the rotating polygonal scanning element shown in FIGS. 2 and 2A, using a polygon motor/mirror rotation detection mechanism.

As shown in FIG. 2 the system further comprises: a laser drive circuit 151 for receiving control signals from system controller 150, and in response thereto, generating and delivering laser (diode) drive current signals to the dual-cavity (i.e. multi-cavity or multi-die) laser source 116, for producing first and second laser scanning beams, spaced slightly apart from each other, during each laser scanning bar code symbol reading cycle, as described in FIG. 2B; a manually-actuated trigger switch 104 integrated with the handle portion of the housing, for activating the laser scanning module 105 and generating a laser scanning beam 114B in the scanning field 115, in response to a trigger event generated when the trigger switch 104 is pulled to its triggering position; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; programmed decode processor 108 for decode processing digitized data signals, and generating symbol character data representative of each bar code symbol scanned by the laser scanning beam 114B; an input/output (I/O) communication interface module 140 for interfacing with a host communication system and transmitting symbol character data thereto via wired or wireless communication links that are supported by the symbol reading system and host system; and the system controller 150 for generating the necessary control signals for controlling operations within the laser scanning bar code symbol reading system 1.

As shown in FIG. 2, the laser scanning module 105 comprises a number of subcomponents, namely: laser scanning assembly 110 including an electromagnetic rotary motor having a rotatable shaft supporting a rotatable polygonal-type scanning element supporting multiple reflective elements (e.g. mirrors); a scanner drive circuit 111 for generating an electrical drive signal to drive the electromagnetic motor in the laser scanning assembly 110; the laser beam production module 112 for producing multiple laser beams 113 in response to control signals A and B; a beam deflecting mirror 114 for deflecting the laser beam 113, as incident beam 114A towards the rotating polygonal mirror which sweeps the deflected laser beam 114B, as illustrated in FIG. 2A, across the laser scanning field and a bar code symbol 116 that might be simultaneously present therein during system operation; and a start of scan/end of scan 136 detector operably connected to controller 150, providing timing control signals to controller 150 upon the occurrence of each complete revolution of the scanning motor, indicating the start of the scan event and the end of the scan event. Typically the laser scanning module 105 is mounted on an optical bench, printed circuit (PC) board within the head portion of the housing, along with the drive circuit 111 in a manner known in the art.

Optionally, a laser pointing subsystem (not shown) can be mounted in the front of its light transmission window 103 so that the IR light transmitter and IR light receiver components of subsystem have an unobstructed view of an object within the laser scanning field of the system. In such an alternative embodiment, the trigger switch 104 would be a two position switch, which activates the pointing beam mechanism when pulled to a first triggering position, and then activates the laser scanning module when pulled to its second trigger position. In such an alternative embodiment, the IR object presence detection module can transmit into the scanning field 115, IR signals having a continuous low-intensity output level, or a pulsed higher-intensity output level, which may be used under some conditions to increase the object detection range of the system. In another alternative embodiment, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference. When operated in its manually triggered mode, the IR-based object detection subsystem would be deactivated, and manually-actuated trigger switch 104 would be operable to generate trigger events when the user manually pulls the trigger switch 104 to its first trigger position to generate a visible pointing beam 221, and then to its second trigger position, when a code symbol is aligned within its laser scanning field and the symbol is ready to be laser scanned.

Specification of the Dual Laser Beam Production (DLBP) Module

FIG. 2A shows the dual laser beam production module employed in system 100 in greater technical detail.

As shown, the dual laser beam production (i.e. DLBP) module is realized as an electro-optical module 112 comprising: a dual-cavity laser source 116 (e.g. dual-cavity VLD), installed in a yoke assembly, having a focusing/collimating lens 116; and an aperture stop 117 having a circular diameter, for shaping the cross-sectional dimensions of the laser beam as it propagates along the common optical axis of the module, as shown. Typically, the die (i.e. laser cavity) separation with the dual cavity VLD 112 will be on the order of 30 microns so that two laser cavities (i.e. dies) will image their focused spots at two spatially separate locations in the field. The focus and profile of these independent laser beams will be quite identical but will gain spatial separation with distance.

As will be described in the illustrative embodiment below, the laser cavities of the dual-cavity visible laser diode (VLD) 116 are sequentially activated and driven in synchronism with a rotating polygonal scanning element 110, using SOS/EOS signals generated by detector 136, 236, so as to produce a different laser beam each laser scanning cycle (i.e. during the time duration of each complete rotation of the polygonal scanning element 110, 210) which is transformed into a dual-type raster-type laser scanning line pattern, for scanning bar code symbols during bar code symbol reading operations, as illustrated in FIG. 2A.

It is understood, however, in an alternative embodiment, where a dual-wavelength dual-laser cavity laser diode 116 is utilized, and each laser cavity emits a different wavelength laser beam, then it is possible to achieve laser return signal separation using dichroic filtering along the optical return path so that both laser cavities (i.e. dies), their different wavelength laser beams, and the first and second raster patterns can be generated simultaneously, under the control of system controller 150, 250, offering many benefits in various scanning applications.

Method of Controlling the Dual-Cavity VLD in Synchronism With the Rotation of the Rotating Polygonal Scanning Element FIG. 2B is a flow chart describing the primary steps of a control process carried out by the system controller, for controlling (i.e. activating and driving) the multi-cavity VLD in synchronism with the rotation of the rotating polygonal scanning element shown in FIGS. 2 and 2A, using a polygon motor/mirror rotation detection mechanism.

As indicated in FIG. 2B, the process begins at the START Block, and at Block A detects the reference position of the rotating polygon scanning element. At Block B, the system controller enables the first laser cavity (i.e. laser die A) in the dual cavity laser diode, and disables the second laser cavity (i.e. laser die B).

At Block C, the system controller determine whether the polygon scanning element has rotated 360 degrees (completed one complete revolution) from the reference position detected in Step A, and the first raster pattern has been generated. If not a complete revolution has not been detected, then the system controller returns to Block B. If the system controller (i.e. SOS/EOS detector 136, 236) has detected a complete revolution of the multi-faceted polygon element 110, 210, then the system controller enables the second laser cavity (i.e. die B) in the dual-cavity laser diode, and disables the first laser cavity (i.e. die A). During the next revolution, the second raster pattern will be generated, and the process repeated.

This control process is carried out when called at Block B in the higher level flow chart specified in FIG. 3, described below.

Method of Controlling Operations Within Bi-Optical Laser Scanning System

Figure 3:
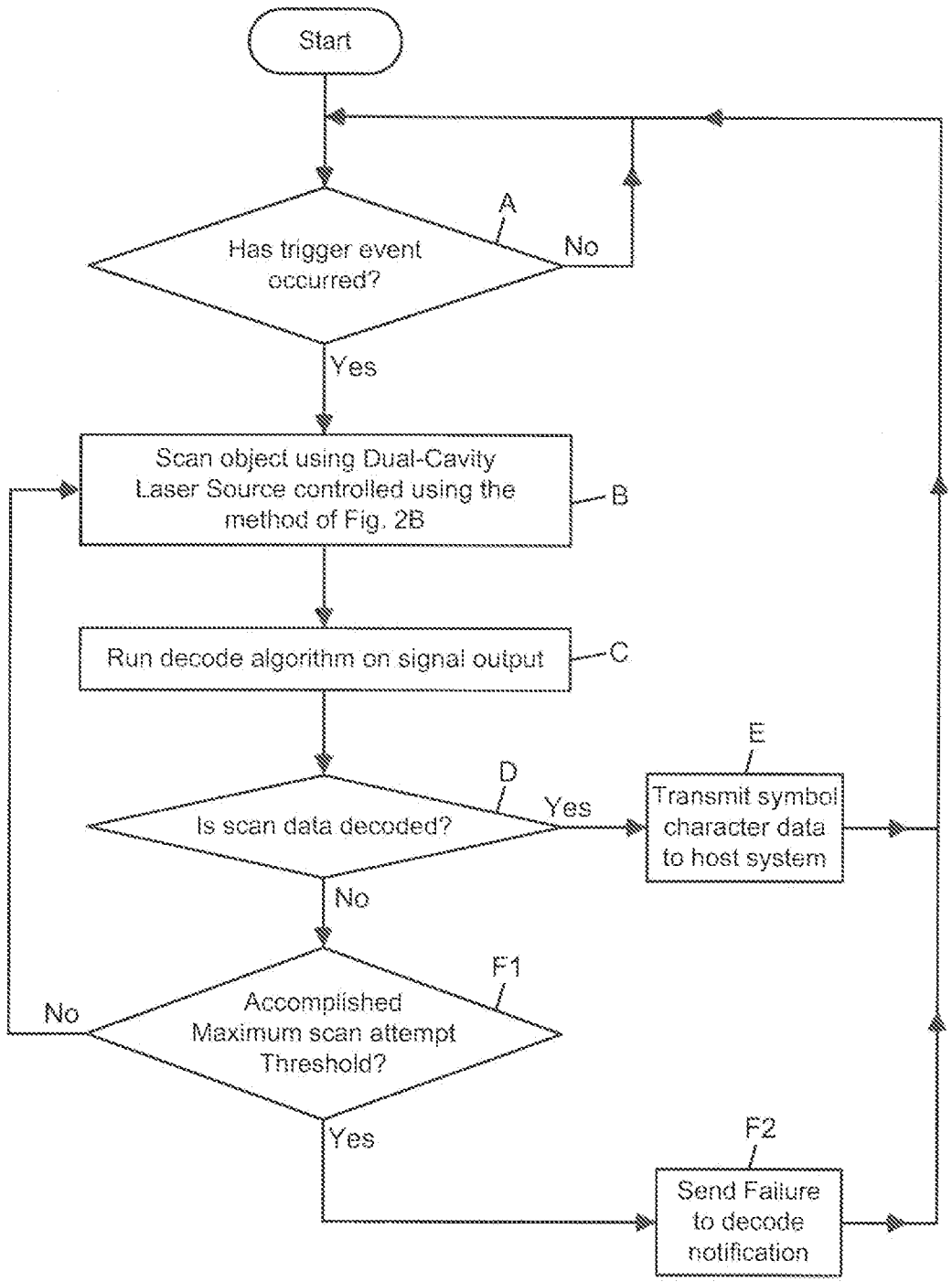
FIG. 3 is a flow chart describing the primary steps of the control process carried out by the system controller in response to the detection of a trigger event within the system of FIG. 1.

As indicated in FIG. 3, the main process orchestrated by system controller 150 begins at the START Block, where all system components are activated. As indicated at Block A in FIG. 3, the system controller 150 determines when an object has been detected in the field of view (FOV), i.e. when a trigger event occurs, and directs the laser scanning module 105 to scan the object using the dual-cavity laser source 116 controlled using the method specified in FIG. 2A.

At Block C, the decode processor 108 runs a decode algorithm on the captured scan data, and if at Block D, a bar code symbol is decoded, then at Block E, the produced symbol character data is transmitted to the host system, and the system controller returns to Block A.

If, however, at Block D a bar code symbol is not decoded, then the system controller 150 determines at Block F1 whether or not the maximum scan attempt threshold has been reached, and if not, then the system controller 150 returns to Block B, and resumes the flow as indicated in FIG. 3.

However, if at Block F1, the system controller 150 determines that the maximum scan attempt threshold has been accomplished, then optionally, the system controller 150 proceeds to Block F2 and sends a Failure to Decode notification to the operator and returns to Block A.

Figure 4A:
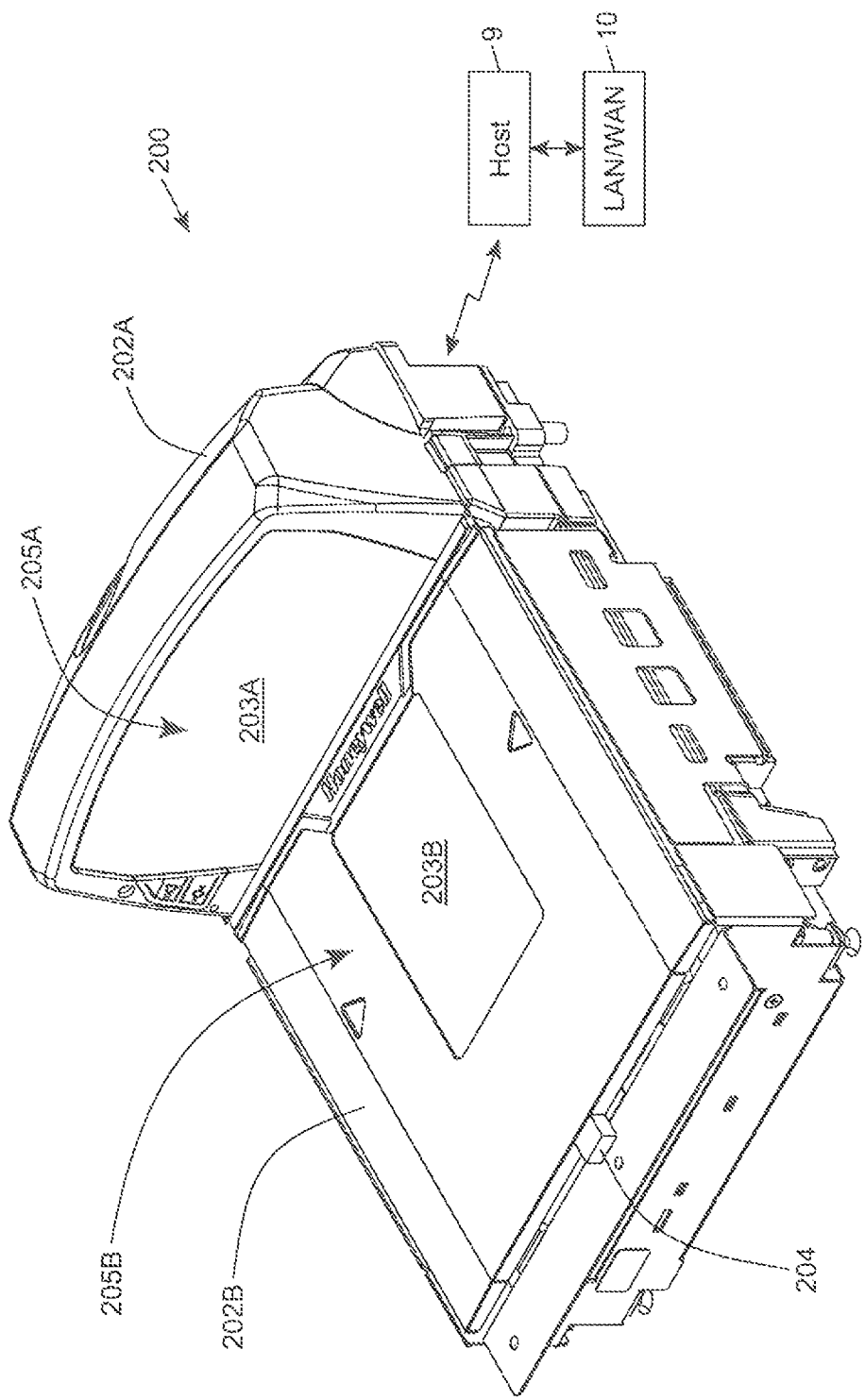
FIG. 4A is a perspective of a bi-optical laser scanning bar code symbol reading system employing a multi-cavity visible laser diode (VLD) to generate multiple raster-type laser patterns during laser scanning operations, illustrated in FIG. 2A.
Figure 4B:
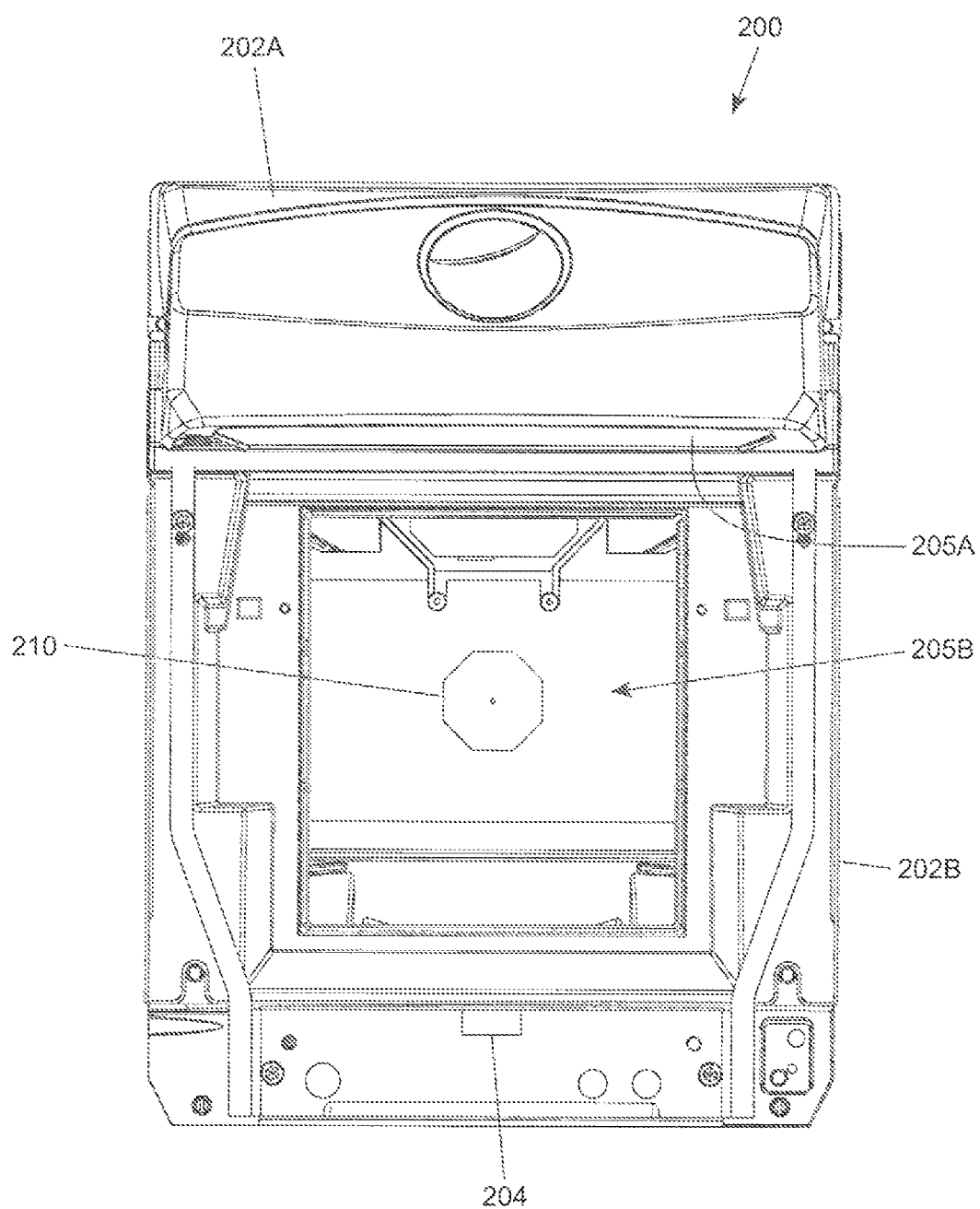
FIG. 4B is a plan view of a bi-optical laser scanning bar code symbol reading system of FIG. 4A.

Specification of the Bi-Optical Laser Scanning System of the Illustrative Embodiment As shown in FIGS. 4A and 4B, the bi-optical laser scanning bar code symbol reading system 200 of the present disclosure comprises: a system housing 202 having a vertical housing section 202A with a vertical optically transparent (glass) scanning window 203A; and a horizontal housing section 202B with a horizontal optically transparent (glass) scanning window 203B. Typically, the system housing is installed at a retail point of sale (POS) checkout station, well known in the art. The retail POS station will have a countertop surface, and oftentimes a conveyor belt for moving products towards the bar code symbol reading system. As shown, the bar code symbol reading system 1 will be interfaced to a host computer system 9 that is connected to the retail LAN and/or WAN, on which one or more product price database systems (RDBMS) will be deployed.

As shown in FIGS. 4A and 4B, the horizontal and vertical sections 202A and 202B of the system housing are arranged in an orthogonal relationship with respect to each other such that the horizontal vertical scanning windows are substantially perpendicular. A pair of laser scanning stations 205A and 205B are mounted within the system housing, for the purpose of generating and projecting complex groups of laser scanning planes through laser scanning windows 203A and 203B. These laser scanning planes intersect and produce an omni-directional laser scanning pattern within a 3D scanning volume 290, defined between the vertical and horizontal scanning windows 203A and 203B.

Figure 5:
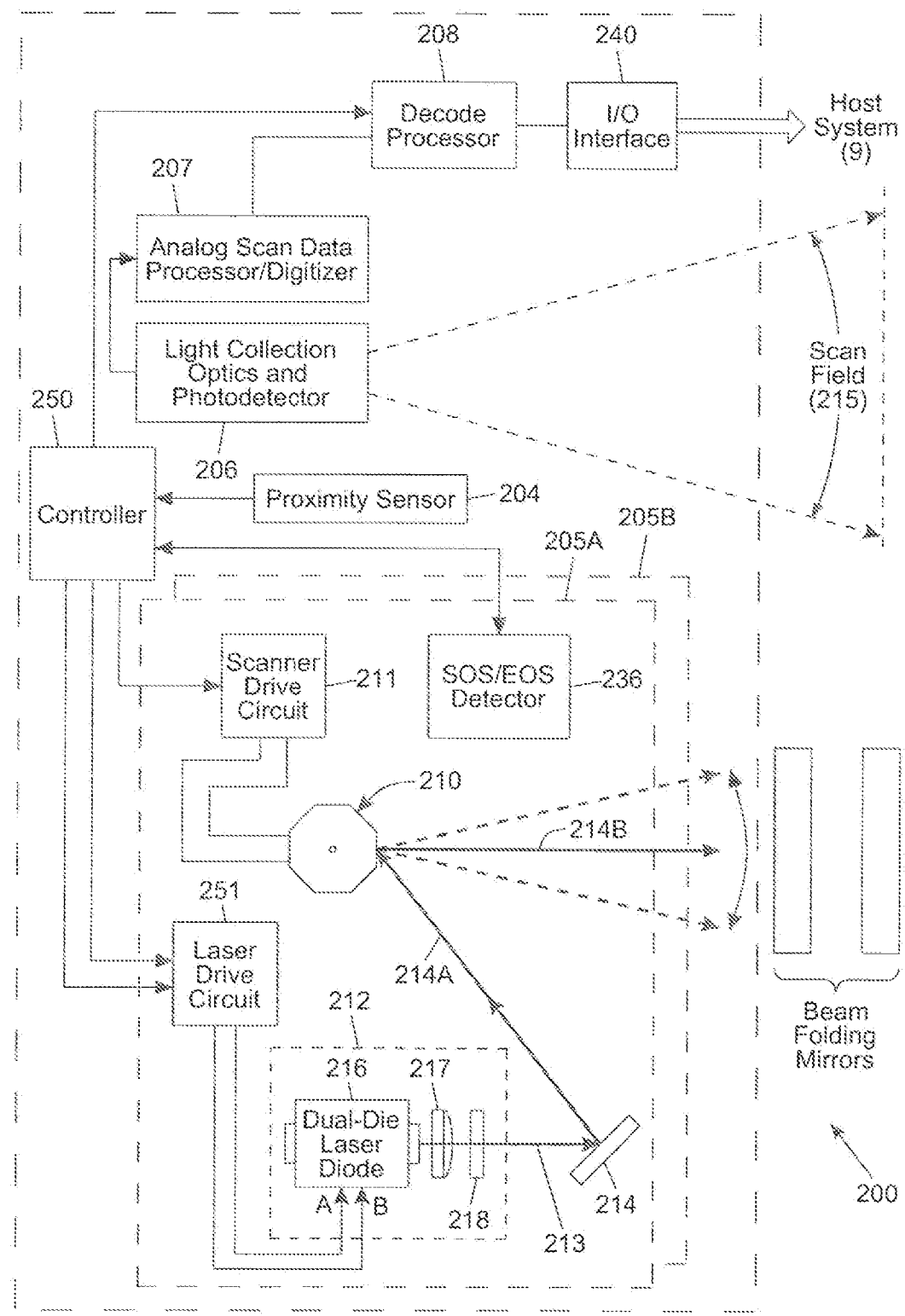
FIG. 5 is a schematic block diagram of the bi-optical laser scanning bar code symbol reading system shown in FIGS. 4A and 4B, wherein an electro-optical module comprising a double-cavity visible laser diode (VLD), a collimating lens, an aperture stop, are used to produce the complex omni-directional double raster-type laser scanning pattern supported by the system.

As shown in FIG. 5, POS-based checkout system 200 generally comprises: retro-reflective laser scanning stations 205A, 205B for generating and projecting groups of laser scanning planes through the vertical and horizontal scanning windows 203A and 203B, respectively, and generating scan data streams from scanning objects in the 3D scanning volume 290; a scan data processing subsystem (i.e. scan data processor) 208 for supporting automatic scan data processing based bar code symbol reading using scan data streams generated from stations 205A and 205B; an input/output subsystem 240 for interfacing with scan data processing subsystem 208, control subsystem 250; start of scan/end of scan 236 detector operably connected to controller 250, control subsystem 250 for controlling (i.e. orchestrating and managing) the operation of the laser scanning stations (i.e. subsystems) 205A, 205B, and other subsystems supported in the system; and IR-based wake-up detector 204, operably connected to the control subsystem 250, for generating and supplying a first trigger signal to the system controller in response to automatic detection of an operator in proximity (e.g. 1-2 feet) of the system housing.

In the illustrative embodiment, the IR-based proximity detector 204 is mounted in the front portion of the housing for automatically detecting the presence of a human operator in front of the 3D scanning volume during system operation. The function of the IR-based proximity detector is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical power within the system. Preferably, the IR-based proximity (i.e. wake-up) detector 204 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

In the illustrative embodiment, each laser scanning station 205A, 205B comprises a number of subcomponents, namely: laser scanning assembly 210 including an electromagnetic rotary motor having a rotatable shaft supporting a rotatable polygonal-type scanning element supporting multiple reflective elements (e.g. mirrors); a scanner drive circuit 211 for generating an electrical drive signal to drive the electromagnetic motor in the laser scanning assembly 210; the laser beam production module 212 for producing multiple laser beams 213 in response to control signals A and B, as shown in FIG. 2A; a beam deflecting mirror 114 for deflecting the laser beam 213, as incident beam 214A towards the rotating polygonal mirror, as shown in FIG. 2A, which sweeps the deflected laser beam 214B, as illustrated in FIG. 5, across the laser scanning field and a bar code symbol 116 that might be simultaneously present therein during system operation; and a start of scan/end of scan 136 detector operably connected to controller 150, providing timing control signals to controller 250 upon the occurrence of each complete revolution of the scanning motor, indicating the start of a scan event and the end of the scan event. Typically each laser scanning module 205A, 205B is mounted on an optical bench along with one or more printed circuit (PC) boards within the housing, in a manner known in the art.

Figure 5A:
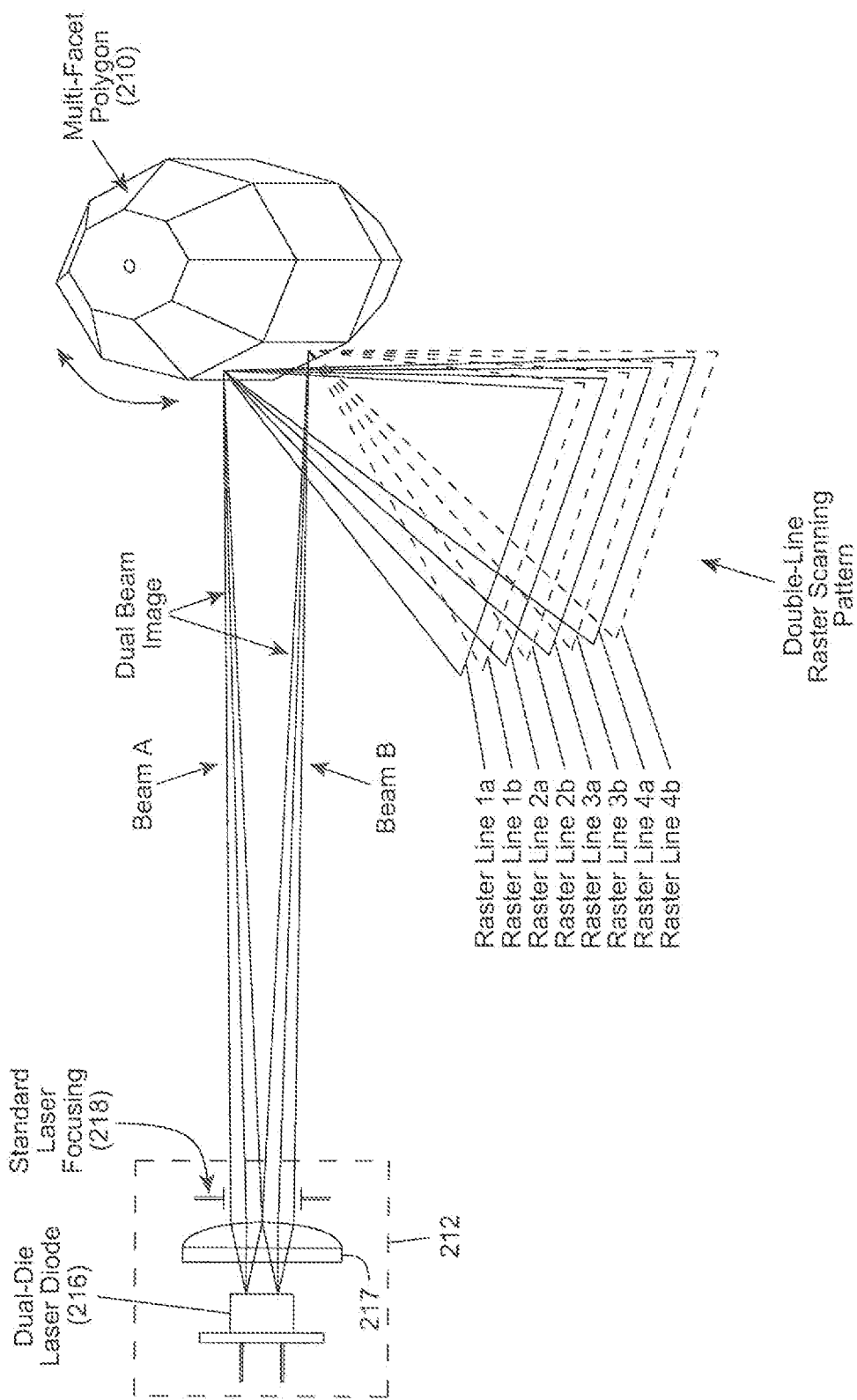
FIG. 5A is a schematic diagram of the electro-optical laser beam production module employed in the system of FIGS. 4A and 4B, comprising a multi-cavity (i.e. multi-die) visible laser diode (VLD), a collimating lens, and an aperture stop through which multiple (e.g. two) laser beams are allowed to pass towards a rotating polygonal-type scanning element.

As shown in FIG. 5A, the laser beam production module 212 comprises: double-cavity visible laser diode (VLD) 216; a collimating lens 217 for collimating light rays from the laser diode 216; an aperture stop 218 for shaping the cross-sectional dimensions of the laser beam 213 passed therethrough.

The function of laser scanning stations 205A, 205B is to produce a complex omni-directional laser scanning pattern comprising double (i.e. multiple) raster-type laser scanning patterns supported by the vertical and horizontal scanning stations within the system.

Method of Controlling Operations Within Bi-Optical Laser Scanning System

Figure 6:
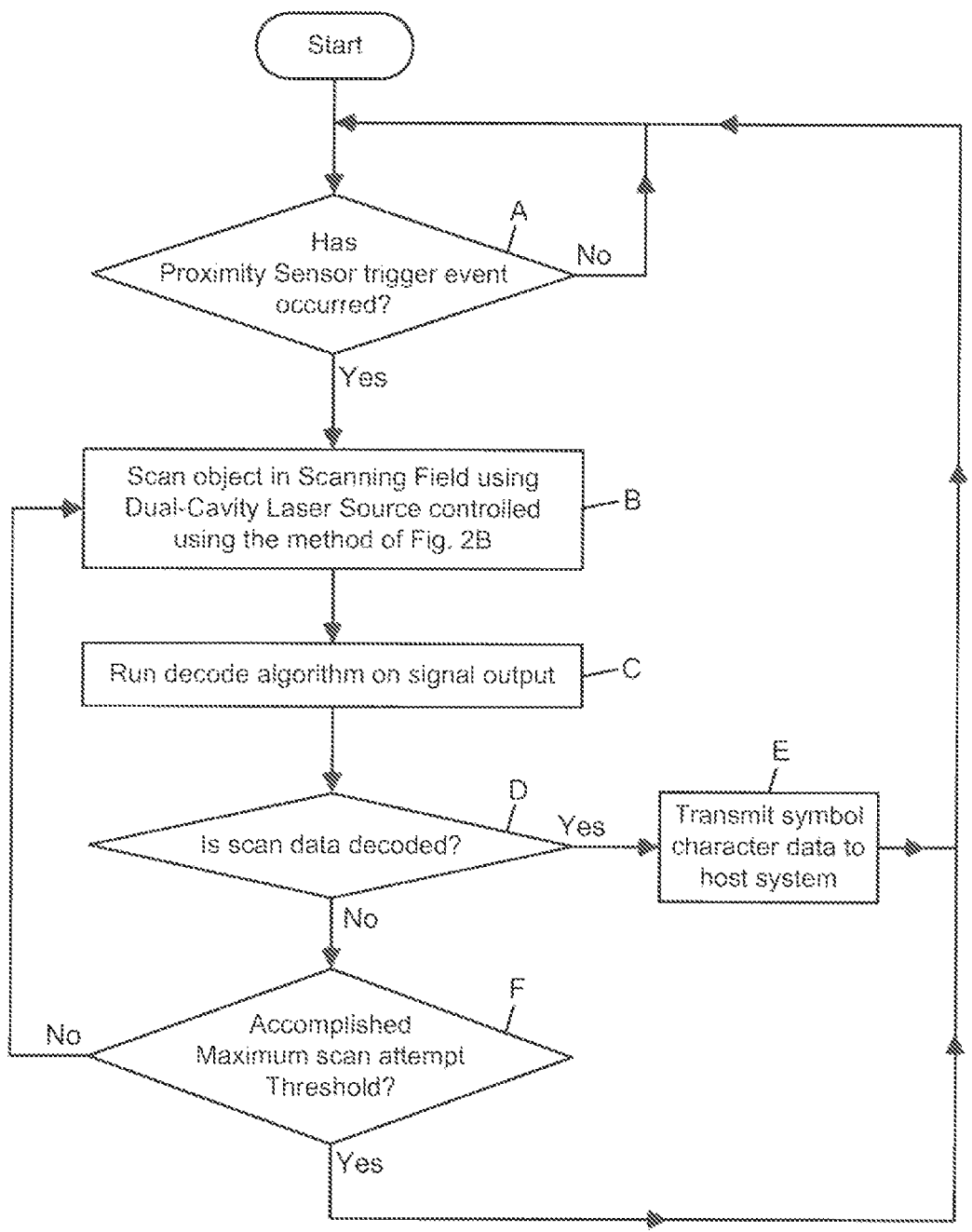
FIG. 6 is a flow chart describing the control process carried out by the system controller in the bi-optical laser scanning bar code symbol reading system of FIG. 5 during laser scanning operations supported therein.

As indicated in FIG. 6, the main process orchestrated by system controller 150 begins at the START Block, where all system components are activated. As indicated at Block A in FIG. 3, the system controller 150 determines when a proximity detector trigger event occurs, and when such an event occurs automatically directs the laser scanning modules 205A, 205B to scan the object in the scanning field, using the dual-cavity laser source 216 controlled by the method specified in FIG. 2A and described hereinabove.

At Block C, the decode processor 108 runs a decode algorithm on the captured scan data, and if at Block D, a bar code symbol is decoded, then at Block E, the produced symbol character data is transmitted to the host system, and the system controller returns to Block A.

If, however, at Block D a bar code symbol is not decoded, then the system controller 250 determines at Block F1 whether or not the maximum scan attempt threshold has been reached, and if not, then the system controller 250 returns to Block B, and resumes the flow as indicated in FIG. 6.

However, if at Block F1, the system controller 250 determines that the maximum scan attempt threshold has been accomplished, then optionally, the system controller 250 proceeds to Block F2 and sends a Failure to Decode notification to the operator and returns to Block A.

Some Modifications Which Readily Come to Mind

While a dual-cavity laser diode has been disclosed in the illustrative embodiments, it is understood that multiple-cavity laser diodes having greater than two laser cavities (e.g. 4, 6, 8, etc) can be used to practice the system and method of the present disclosure with excellent results. When doing so, the drive circuitry will be extended to drive these additional laser cavities in synchronism with the rotating polygon, under the control process supported by the system controller.

Also, while a polygonal based laser scanning mechanism has been disclosed in the illustrative embodiments, it is also understood that other types of laser scanning mechanism can be used to transform multiple synchronously generated laser beams into multiple raster-type laser scanning patterns to read high density 2D stacked bar code symbologies with improved levels of performance.

The illustrative embodiment have been described in connection with several different types of code symbol reading system capable of reading 1-D and 2-D bar code structures (e.g. 1D bar code symbols, 2D stacked linear bar code symbols, and 2D matrix code symbols). Hereinafter, the term "code symbol" shall be deemed to include all such code symbols.

It is understood that the digital-imaging based bar code symbol reading system of the illustrative embodiments may be modified in a variety of ways which will become readily apparent to those skilled in the art or having the benefit of the novel teachings disclosed herein. All such modifications and variations of the illustrative embodiments thereof shall be deemed to be within the scope of the Claims appended hereto.

What is claimed is:

1. A laser scanning bar code symbol reading system operable to scan and read bar code symbols, said laser scanning bar code symbol reading system having a working range and comprising:
    a housing having a light transmission window;
    a multi-cavity visible laser diode (VLD) having multiple laser cavities that are sequentially activated and driven to produce multiple laser beams; and
    a laser scanning mechanism including a rotating scanning element, having multiple reflective facets, for scanning said multiple laser beams as said rotating scanning element rotates about its axis of rotation;
    wherein each of said laser beams produced by each cavity of said multi-cavity VLD is spaced apart along an optical axis, and directed towards said rotating scanning element to generate multiple sets of parallel raster scanning lines which are projected through said light transmission window and into a scanning field defined external to said light transmission window, and
    wherein when a bar code symbol is presented within said scanning field, the bar code symbol is scanned by one or more of said multiple sets of raster scanning lines, and said system reads the bar code symbol.

2. The laser scanning bar code symbol reading system of claim 1, wherein said rotating scanning element is a polygonal scanning element.

3. The laser scanning bar code symbol reading system of claim 1, wherein each said laser beam produced by said multi-cavity visible laser beam is generated during a different laser scanning cycle.

4. The laser scanning bar code symbol reading system of claim 1, wherein each said laser beam produced by said multi-cavity visible laser beam is generated during the same laser scanning cycle.

5. The laser scanning bar code symbol reading system of claim 1, which further comprises:
    light collection optics for collecting light reflected/scattered from scanned object in said scanning field, and a photo-detector for detecting the intensity of collected light and generating a first signal corresponding to said detected light intensity during scanning operations;
    a signal processor for processing the first signal and converting the processed first signal into a second signal; and
    a programmed decode processor for decode processing the second signal and generating symbol character data representative of each bar code symbol scanned by one or more of said multiple sets of raster scanning lines.

6. The laser scanning bar code symbol reading system of claim 5, comprising:
    an input/output (I/O) communication interface module for interfacing with a host communication system and transmitting symbol character data thereto via wired or wireless communication links that are supported by the symbol reading system and host system; and
    a system controller for generating the necessary control signals for controlling operations within said laser scanning bar code symbol reading system.

7. The laser scanning bar code symbol reading system of claim 1, wherein said housing comprises a hand-supportable housing.

8. The laser scanning bar code symbol reading system of claim 1, wherein said housing comprises a countertop-based housing.

9. The laser scanning bar code symbol reading system of claim 1, wherein said bar code symbol is a code symbol selected from the group consisting of 1D bar code symbols, and 2D stacked bar code symbols.

10. The laser scanning bar code symbol reading system of claim 1, comprising a trigger switch associated with said housing.

11. A method of scanning and reading a bar code symbol using a laser scanner, the method comprising the steps of:
    (a) in a housing, sequentially activating and driving a plurality of laser cavities of a multi-cavity laser diode to generate, along an optical axis, multiple laser beams, each laser beam being generated from a different laser cavity of said multi-cavity laser diode;
    (b) within said housing, rotating a polygonal scanning element, with multiple reflective facets, about an axis of rotation;
    (c) directing said multiple laser beams towards said rotating polygonal scanning element to generate multiple sets of parallel raster scanning lines within said housing;
    (d) projecting said multiple sets of parallel raster scanning lines through said light transmission window within a scanning field defined external to said light transmission window; and
    (e) presenting a bar code symbol within said scanning field for scanning by one or more of said multiple sets of parallel raster scanning lines.

12. The method of claim 11, wherein step (a) comprises sequentially activating and driving the laser cavities of said multi-cavity laser diode to generate, along an optical axis, multiple laser beams, each laser beam being generated from a different laser cavity of said multi-cavity laser diode during a different laser scanning cycle.

13. The method of claim 11, wherein step (a) comprises sequentially activating and driving the laser cavities of said multi-cavity laser diode to generate, along an optical axis, multiple laser beams, each laser beam being generated from a different laser cavity of said multi-cavity laser diode during the same laser scanning cycle.

14. The method of claim 11, comprising:

collecting light reflected from a bar code symbol in said scanning field, detecting the intensity of said collected light, and generating a first signal corresponding to said detected light intensity during scanning operations;

processing the first signal and converting the processed first signal into a second signal; and decode processing the second signal and generating symbol character data representative of each bar code symbol scanned by said parallel raster scanning lines.

15. The method of claim 11, wherein said bar code symbol is a code symbol selected from the group consisting of 1D bar code symbols, and 2D stacked bar code symbols.

* * * * *